H. M. HUNTER.
ROLLER CLUTCH.
APPLICATION FILED MAR. 30, 1911.

1,024,580.

Patented Apr. 30, 1912.
2 SHEETS—SHEET 1.

Witnesses:
R. W. Pittman
F. E. Boyce

Inventor:
Hughey M. Hunter
By his Attorney

H. M. HUNTER.
ROLLER CLUTCH.
APPLICATION FILED MAR. 30, 1911.
1,024,580.
Patented Apr. 30, 1912.
2 SHEETS—SHEET 2.
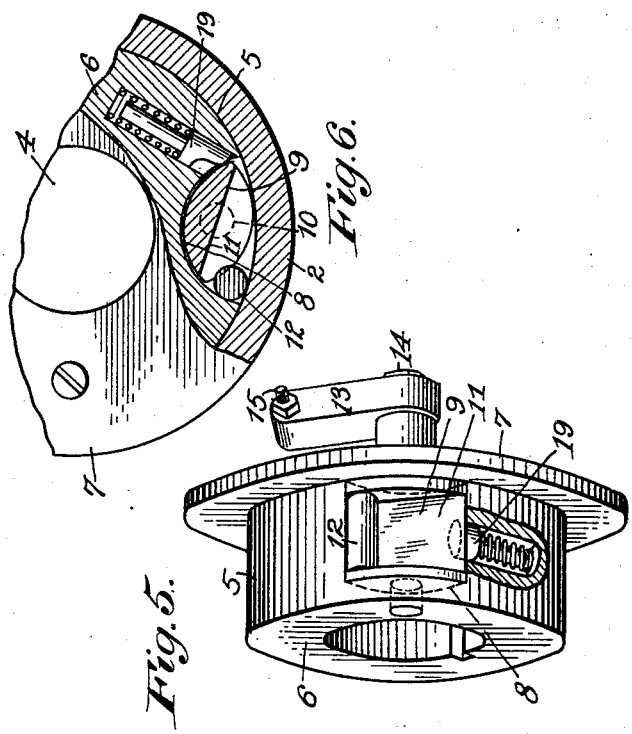
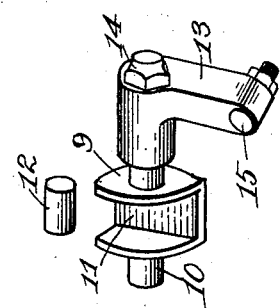
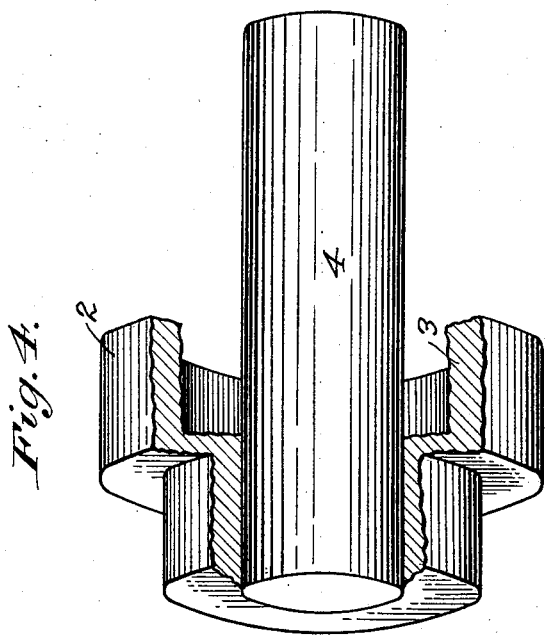
Witnesses:
R. M. Pittman
F. E. Boyce
Inventor
Hughey M. Hunter
By his Attorney

UNITED STATES PATENT OFFICE.

HUGH M. HUNTER, OF CLEVELAND, OHIO, ASSIGNOR TO THE NATIONAL ACME MANUFACTURING COMPANY, OF CLEVELAND, OHIO, A CORPORATION OF OHIO.

ROLLER-CLUTCH.

1,024,580.     Specification of Letters Patent.     Patented Apr. 30, 1912.

Application filed March 30, 1911. Serial No. 617,830.

*To all whom it may concern:*

Be it known that I, HUGH M. HUNTER, a citizen of the United States, residing at Cleveland, in the county of Cuyahoga and State of Ohio, have invented certain new and useful Improvements in Roller-Clutches, of which the following is a specification.

This invention relates to clutches, the object thereof being to provide an improved roller clutch extremely simple in construction and effective in use, and so organized that the driving member of the clutch may be freely rotated in one direction but is effectively locked and prevented from rotating in the opposite direction when the clutch engaging means is thrown into operation.

Figure 1:
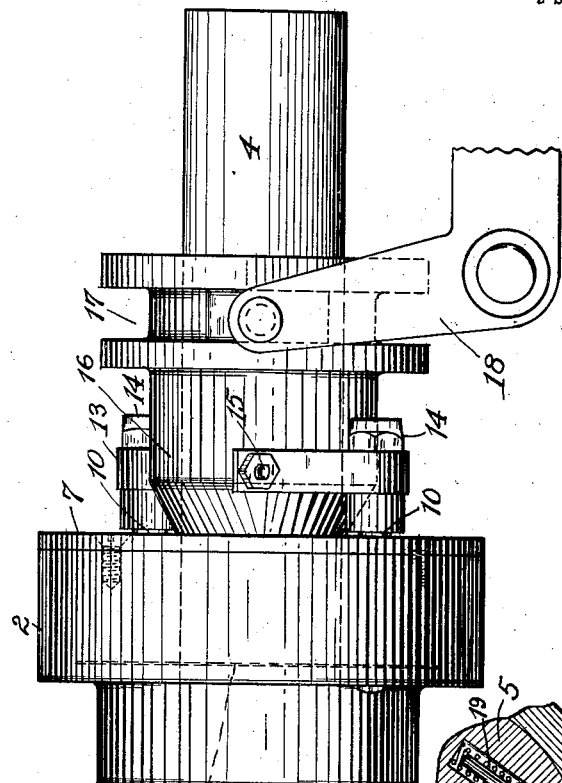
Figure 3:
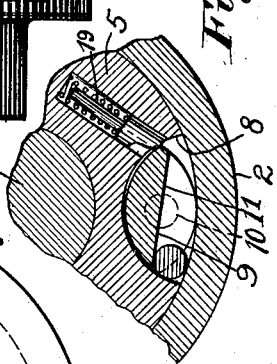
Figure 2:
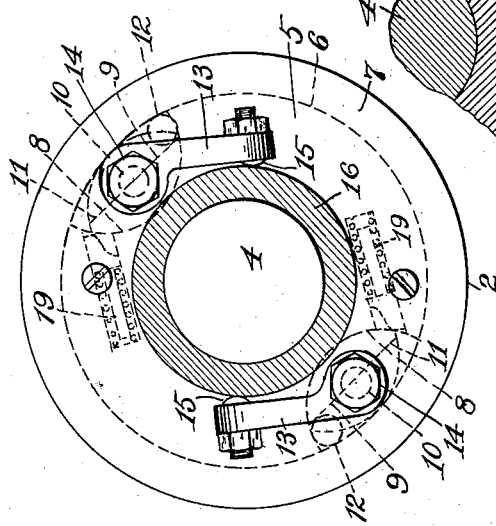

In the drawings accompanying and forming part of this specification, Figure 1 is a side view of this improved clutch; Fig. 2 is an end view looking from right to left; Fig. 3 is a detail sectional view of a portion of the male member of the clutch; Fig. 4 is a partly sectional view of the female member of the clutch and the shaft carrying the same; Fig. 5 is a side view of the male member of the clutch detached; Fig. 6 is a partly sectional end view of such female member; and Fig. 7 is a detail view of a part of the clutch engaging means.

Similar characters of reference indicate corresponding parts throughout the figures of the drawings.

In the preferred embodiment thereof herein shown this improved clutch comprises what is herein designated as the female member 2, comprising a cylindrical head 3 loose on the shaft 4. This head may be of any suitable formation for the purpose of transmitting power, although it is conceivable also that the head may be the driving member instead of the driven member, but in the present instance the shaft 4 constitutes the driving shaft and ordinarily would be constantly running. Fitting within this head is what is herein designated as the male member 5 which in practice is keyed or otherwise fixed to the shaft 4 and comprises a bored disk 6 of relatively large width fitting the shaft and adapted to project into the cylindrical head, the relative arrangement of the head and disk being such that one rotates within the other, the two members being held in rotatable engagement by a cap plate 7 fastened to the head. The disk is provided at its periphery with segmental-shaped recesses 8, shown herein as two in number, in which are fitted oscillating pockets 9, the upper side edges of which are machined to permit the free movement of the pockets during the oscillation or swinging thereof, these pockets being supported for oscillation by threaded pins 10 turned into the disk. Each of the pockets has an inclined runway or bottom 11 communicating with one of the segmental walls of the disk 6, and in each runway is located a roller bearing 12 forming directly the clutch engaging member.

Secured on the threaded pins at the outer side of the cap plate is a pair of clutch arms or shifters 13, being held on the pins by nuts 14. Each of these shifters forms a crank and therefore comprises a hub and an arm, and each carries at its outer end an adjustable pin 15 for engaging with a shiftable cone 16, which is provided with a collar 17 and is slid back and forth upon the shaft by some suitable clutch shifting means, usually comprising an oscillating arm 18 operated by a cam.

In operation the member 5 and shaft 4 rotate together and when the cone is thrown into engagement with the clutch operating arms the same are spread, whereupon the pockets are oscillated to throw the roller bearings into engagement with the inner surface of the cylindrical head, so that said head is rotated with the shaft and is prevented from rotating in the reverse direction, or backward, by reason of the fact that the rollers may readily turn so long as the member is being rotated forward but on the reverse movement the rollers come into engagement with the segmenetally formed surfaces of the recesses carried by the disk and lose their free way and consequently choke and thus prevent the backward turning of the rotating member in a manner which will be readily understood. When the cone is withdrawn from between the clutch arms the same are retracted by means provided for that purpose, which in the present instance comprises a spring pressed plunger 19 located in an opening in the disk and in engagement with its oscillating pocket, whereby when the cone is withdrawn the pockets are oscillated into their normal position and so release the member 5.

I claim as my invention:

1. A roller clutch comprising a cylindrical member and a disk-shaped member fitting therein, said members rotatable one relatively to the other, an oscillatory pocket carried by said disk-shaped member and having a runway, a roller carried by said pocket, and means for oscillating said pocket to bring the roller into engagement with the cylindrical member.

2. A roller clutch comprising a cylindrical member and a disk-shaped member fitting therein, said members rotatable one relatively to the other, an oscillatory pocket carried by said disk-shaped member and having a runway, a roller carried by said pocket, means for oscillating said pocket to bring the roller into engagement with the cylindrical member, and means for oscillating said pocket in the opposite direction.

3. A roller clutch comprising a cylindrical member and a disk-shaped member fitting therein, said members rotatable one relatively to the other, an oscillatory pocket carried by said disk-shaped member and having a runway, a roller carried by said pocket, means for oscillating said pocket to bring the roller into engagement with the cylindrical member, and means for oscillating said pocket in the opposite direction, said means comprising a spring pressed plunger.

4. A roller clutch comprising a cylindrical member and a disk-shaped member fitting therein, said members rotatable one relatively to the other, a pair of oppositely disposed oscillatory pockets carried by said disk-shaped member, each having a runway, a roller carried by each pocket, and means for oscillating said pockets to bring the rollers into engagement with the cylindrical member.

5. A roller clutch comprising a cylindrical member and a disk-shaped member fitting therein, said members rotatable one relatively to the other, a pair of oppositely disposed oscillatory pockets carried by said disk-shaped member, each having a runway, a roller carried by each pocket, and means for oscillating said pockets to bring the rollers into engagement with the cylindrical member, said disk-shaped member and pockets constructed to permit the choking of the roller when in one position thereof whereby one member may rotate freely forward but is prevented from rotating backward.

6. A roller clutch comprising a cylindrical member and a disk-shaped member fitting therein, said members rotatable one relatively to the other, a pair of oppositely disposed oscillatory pockets carried by said disk-shaped member, each having a runway, a roller carried by each pocket, means for oscillating said pockets to bring the rollers into engagement with the cylindrical member, said disk-shaped member and pockets constructed to permit the choking of the roller when in one position thereof whereby one member may rotate freely forward but is prevented from rotating backward, and spring-actuated means carried by the disk-shaped member for oscillating each of said pockets in one direction.

7. A roller clutch comprising a cylindrical member and a disk-shaped member fitting therein, said members rotatable one relatively to the other, a plurality of oscillatory pockets carried by said disk-shaped member, each having an inclined runway, a roller carried by each of said pockets, and means for oscillating said pockets to bring the rollers into engagement with the cylindrical member and comprising a pair of crank arms and a sliding cone.

8. A roller clutch comprising a cylindrical member and a disk-shaped member fitting therein, said members rotatable one relatively to the other, a plurality of oscillatory pockets carried by said disk-shaped member, each having an inclined runway, a roller carried by each of said pockets, and means for oscillating said pockets to bring the rollers into engagement with the cylindrical member and comprising a pair of crank arms and a sliding cone, said disk-shaped member and each of said pockets constructed to permit the choking of the rollers in one position thereof whereby one member may rotate freely forward but is prevented from rotating backward.

9. A roller clutch comprising a cylindrical member and a disk-shaped member fitting therein, said members rotatable one relatively to the other, a plurality of oscillatory pockets carried by said disk-shaped member, each having an inclined runway, a roller carried by each of said pockets, means for oscillating said pockets to bring the rollers into engagement with the cylindrical member and comprising a pair of crank arms and a sliding cone, said disk-shaped member and each of said pockets constructed to permit the choking of the rollers in one position thereof whereby one member may rotate freely forward but is prevented from rotating backward, and spring-actuated means carried by the disk-shaped member for oscillating each of said pockets in one direction.

10. A roller clutch comprising a cylindrical member and a disk-shaped member fitting therein, said members rotatable one relatively to the other, one or more oscillatory pockets carried by one of said members and each having a runway, a roller carried by each of said pockets, and means for oscillating said pocket or pockets to bring the roller into engagement with one of said members, said pocket carrying member and pocket constructed to permit the choking of the roller or rollers when in one position thereof whereby one member may rotate freely forward but is prevented from rotating backward.

11. A roller clutch comprising a cylindrical member and a disk-shaped member fitting therein, said members rotatable one relatively to the other, a pair of oscillatory pockets carried by one of said members and each having an inclined runway, a roller carried by each of said pockets, and means for oscillating said pockets to bring the rollers into engagement with one of said members, said pocket carrying member and pocket constructed to permit the choking of the rollers when in one position thereof whereby one member may rotate freely forward but is prevented from rotating backward.

12. A roller clutch comprising a cylindrical member and a disk-shaped member fitting therein, said members rotatable one relatively to the other and said disk-shaped member having one or more segmental recesses, an oscillatory pocket fitting into each of said recesses and having an inclined runway, a roller carried by each of said pockets, means for oscillating each of said pockets to bring its roller into engagement with the cylindrical member and comprising a crank arm and a sliding cone, said disk-shaped member and pocket constructed to permit the choking of the roller when in one position thereof whereby one member may rotate freely forward but is prevented from rotating backward, and spring-actuated means carried by the disk-shaped member for returning each of said pockets to its normal position.

13. In a roller clutch, the combination with a driving shaft of a disk-shaped driving member secured thereto for rotation therewith, a driven member loosely mounted with relation to said shaft and into which the disk-shaped member projects, an oscillatory pocket carried by said disk-shaped member and having a runway, a roller carried by said pocket, and means for oscillating said pocket to bring the roller into engagement with the driven member whereby the latter will be driven with the driving member.

14. In a roller clutch, the combination with a driving shaft of a disk-shaped driving member secured thereto for rotation therewith, a driven member loosely mounted with relation to said shaft and into which said driving member projects, said disk-shaped member having one or more recesses therein, an oscillatory member in each of said recesses, a roller carried by each of said oscillatory members, and means for oscillating said members to bring the rollers into engagement with the driven member whereby it will be rotated with the driving member.

Signed at Cleveland, Ohio, this 28th day of March, 1911.

HUGH M. HUNTER.

Witnesses:
J. G. LOE,
P. F. MELLINGER.

---

Copies of this patent may be obtained for five cents each, by addressing the "Commissioner of Patents, Washington, D. C."